United States Patent [19]
Uchida et al.

[11] Patent Number: 5,563,378
[45] Date of Patent: Oct. 8, 1996

[54] CABLE CLAMP FOR MOTOR

[75] Inventors: Hiroyuki Uchida; Tomonaga Yamamoto; Takeshi Tamaki, all of Yamanashi, Japan

[73] Assignee: Fanuc, Ltd., Yamanashi, Japan

[21] Appl. No.: 336,732

[22] Filed: Nov. 4, 1994

[30]     Foreign Application Priority Data

Dec. 9, 1993 [JP] Japan ................................. 5-308838

[51] Int. Cl.6 .................................................. H02G 15/00
[52] U.S. Cl. ........................ 174/135; 174/151; 174/168; 248/56; 248/74.4
[58] Field of Search .................... 174/135, 168, 174/138 F, 151, 152 A, 154; 248/56, 24.4

[56]                 References Cited

U.S. PATENT DOCUMENTS 3,809,798  5/1974  Simon ................................. 174/135 X
4,407,042  10/1983 Schramme et al. ................... 248/56 X
4,487,386  12/1984 Hehl ......................................... 248/56
4,688,747  8/1987  Helmsdorfer et al. .................... 248/56
4,698,459  10/1987 Drake ................................. 174/138 F
4,735,577  4/1988  Munroe et al. ......................... 439/113
4,888,453  12/1989 Blasko ................................... 174/135

*Primary Examiner*—Kristine L. Kincaid
*Assistant Examiner*—Paramita Ghosh
*Attorney, Agent, or Firm*—Staas & Halsey

[57]                  ABSTRACT

A cable clamp for clamping a motor cable includes a fixing member having a pair of bottom plates. The bottom plates are placed in parallel to each other to thereby define an opening. A pair of guide members are also placed in parallel to each other and bridge the bottom plates to further limit the opening. The motor cable is then received through the opening. A slide member slides along the pair of guide members to thereby clamp the cable. The bottom plates may optionally include a depression near the opening which defines a recess. A waterproof adhesive may be disposed within the recess to thereby form a watertight barrier.

8 Claims, 4 Drawing Sheets

Fig. 1           PRIOR ART

CABLE CLAMP FOR MOTOR

FIELD OF THE INVENTION

This invention relates to a cable clamp for a motor. More specifically, this invention relates to a cable clamp for a motor which is small in size.

BACKGROUND OF THE INVENTION

A connector is usually employed to draw out a cable from a motor. However, since a connector applicable to a small motor is not available at the market place, the cable is usually drawn out of the small motor without employing a connector. In this case, a rubber bush is conventionally employed instead of a connector. Namely, as shown in FIG. 1, a cable 6 of a small motor is drawn out of the motor through a rubber bush 8 fixed to a frame 5 of the motor. In the case where watertightness is required, a waterproof adhesive 7 is applied to seal the potential openings existing between the cable 6 and the rubber bush 8, and existing between the rubber bush 8 and the motor frame 5.

Since it is difficult for a rubber bush to firmly fix a cable to a motor frame, some supplemental means is required to firmly fix the cable to the motor frame. Moreover, it is extremely difficult for a rubber bush to maintain watertightness between the cable and the rubber bush and between the rubber bush and the motor frame, because the applied adhesive readily peels off when given stress by movement of the cable.

SUMMARY OF THE INVENTION

Therefore, the object of this invention is to provide a cable clamp for a motor in which a cable can be firmly fixed to a motor frame and the reliable watertightness can be realized between the cable and the motor frame.

To achieve the foregoing object, a cable clamp for a motor in accordance with this invention is provided by a fixing member having a pair of bottom plates which are placed in parallel to each other, while defining an opening therebetween to allow a cable to come out from a motor frame, and having a pair of guide members which are placed in parallel to each other, bridging the bottom plates and having stoppers thereon, and a slide member which slides along the pair of guide members thereby maintaining a hollow space therein to allow a cable to go out of the slide member.

BRIEF DESCRIPTION OF THE DRAWINGS

This invention, together with its various features and advantages, can be readily understood from the following more detailed description presented in conjunction with the following drawings, in which.

DETAILED DESCRIPTION OF THE PREFERRED EMBODIMENTS

Figure 1:
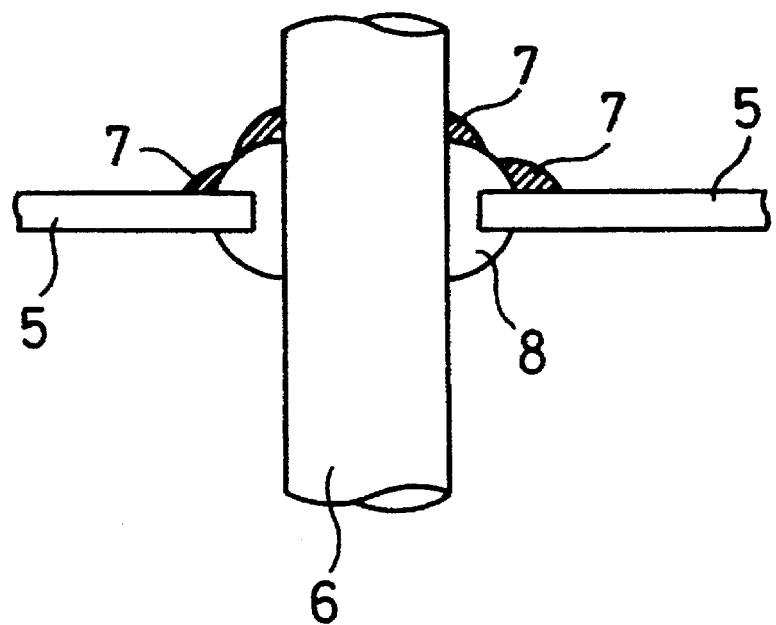
FIG. 1 (Prior Art) is a cross section of a cable drawn out of the frame of a motor through a rubber bush.

Referring now to the drawings, a detailed description will be presented below for a cable clamp for a motor in accordance with embodiments of this invention.

Figure 3:
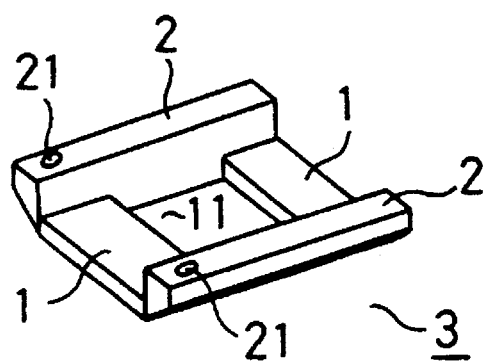
FIG. 3 is a perspective view of a fixing member of a cable clamp for a motor in accordance with this invention.

Referring to FIG. 3, a fixing member 3 has a pair of bottom plates 1 which are placed in parallel to each other to define an opening 11 therebetween. The opening 11 allows a cable to come out from a motor frame (not shown). The fixing member 3 further has a pair of guide members 2 which are placed in parallel to each other and bridge the bottom plates 1. The guide members 2 have stoppers 21 thereon. The fixing member 3 can be made of elastic materials potentially either by plastic fabrication or by aluminum die casting.

Figure 4:
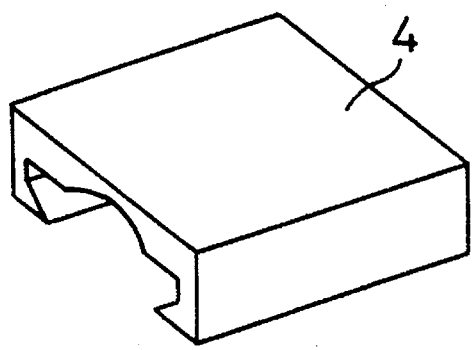
FIG. 4 is a perspective view of a slide member of a cable clamp for a motor in accordance with this invention.

Referring to FIG. 4, a slide member 4 has a structure to slide along the pair of guide members 2, and to define a hollow space therein facing the opening 11. Counterparts of the stoppers 21 arranged on the guide members 2 are arranged at a location corresponding to the stoppers 2 on the internal surface of the slide member 4. The slide member 4 also can be made of elastic materials potentially either by plastic fabrication or by aluminum die casting.

Figure 2:
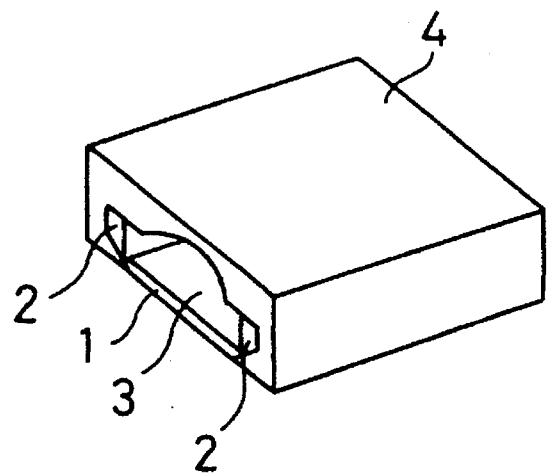
FIG. 2 is a perspective view of a cable clamp for a motor in accordance with this invention.

Referring to FIG. 2, the cable clamp for a motor is fabricated by sliding the fixing member 3 into the slide member 4.

FIRST EMBODIMENT

Figure 5:
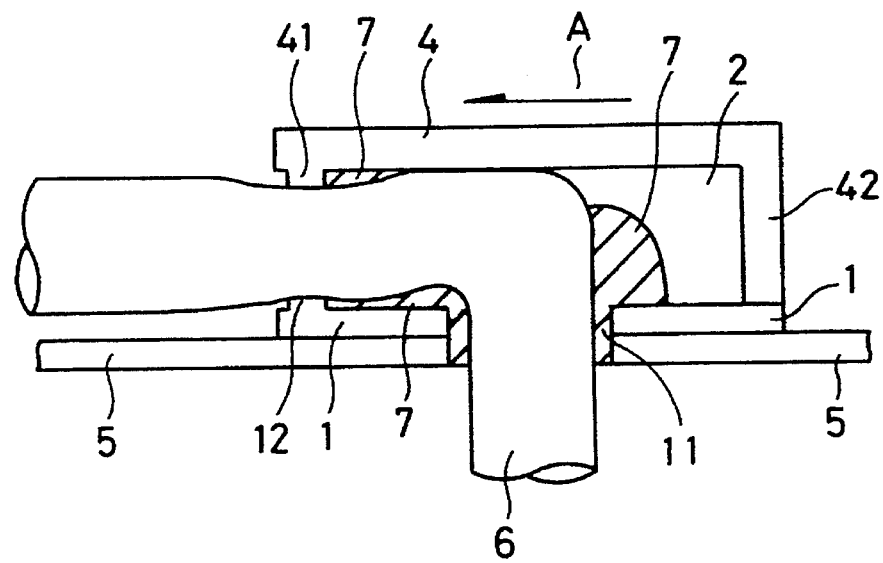
FIG. 5 is a cross section illustrating a manner of employment in which a cable clamp for a motor is secured in accordance with a first embodiment of this invention.

Referring to FIG. 5, when employing the cable clamp for a motor in accordance with this invention, the fixing member 3 is arranged on the motor frame 5 at a location where the opening 11 of the fixing member 3 accords with the opening of the motor frame 5. A cable 6 is drawn out of the motor frame 5 through the opening 11 of the fixing member 3, and is sharply bent to a direction parallel to the bottom plates 1, before the slide member 4 is slid in the direction of arrow A to cover the fixing member 3. Provided the diameter of the cable 6 accords with the dimensions of the hollow space of the slide member 4, the cable 6 can be firmly fixed by the cable clamp of motor. If the bottom plate 1 and/or the slide member 4 are provided with projections 12 and/or 41, as shown in FIG. 5, the cable 6 can be fixed more firmly. If a waterproof adhesive 7 is applied, as shown by slashes in FIG. 5, watertightness can be achieved. In this case, a back cover 42 arranged about the back of to the slide member 4 is effective to prevent the waterproof adhesive 7 from leaking outside.

The reason why a rubber bush can not firmly fix a cable is that the cable is fixed elastically. In the case of the cable clamp of a motor in accordance with this invention, however, the cable 6 is firmly held by the bottom plate 1 of the fixing member 3 and the slide member 4. As a result, the cable 6 does not move. In spite of the application of stress, the cable 6 is firmly fixed.

SECOND EMBODIMENT

Figure 6:
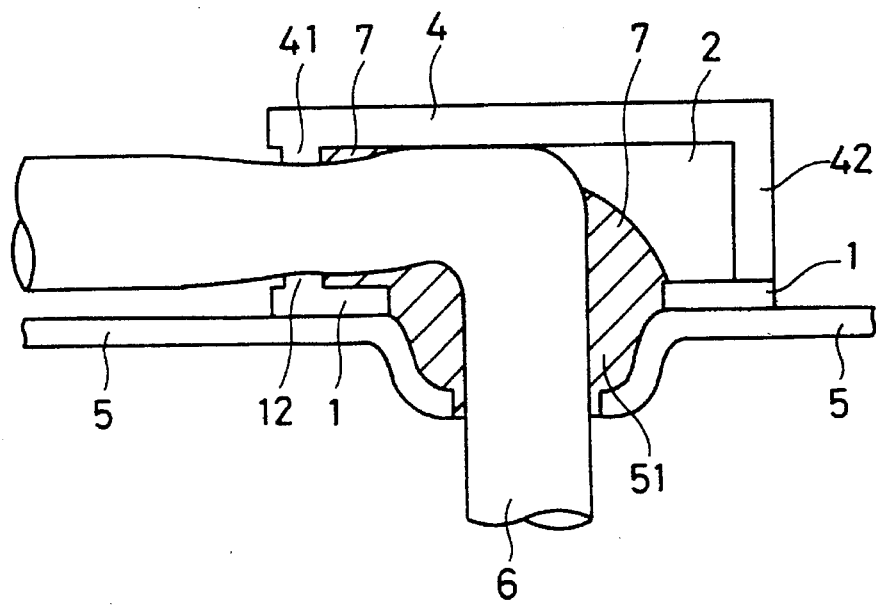
FIG. 6 is a cross section illustrating a manner of employment in which a cable clamp a motor is secured in accordance with a second embodiment of this invention.

Referring to FIG. 6, a recess 51, produced at a location corresponding to the opening 11 of the fixing member 3 on the motor frame 5, is effective to keep the waterproof adhesive 7 therein, resultantly enhancing the watertightness.

THIRD EMBODIMENT

Figure 7:
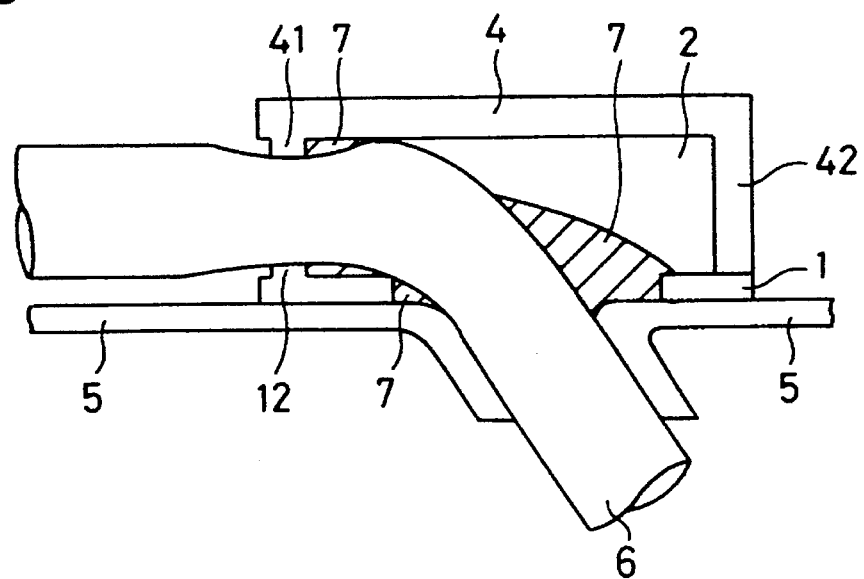
FIG. 7 is a cross section illustrating a manner of employment in which a cable clamp for a motor is secured in accordance with a third embodiment of this invention.

Referring to FIG. 7, inclination of the opening of the motor frame 5 allows easy assembly of the cable clamp of motor.

FOURTH EMBODIMENT

Figure 8:
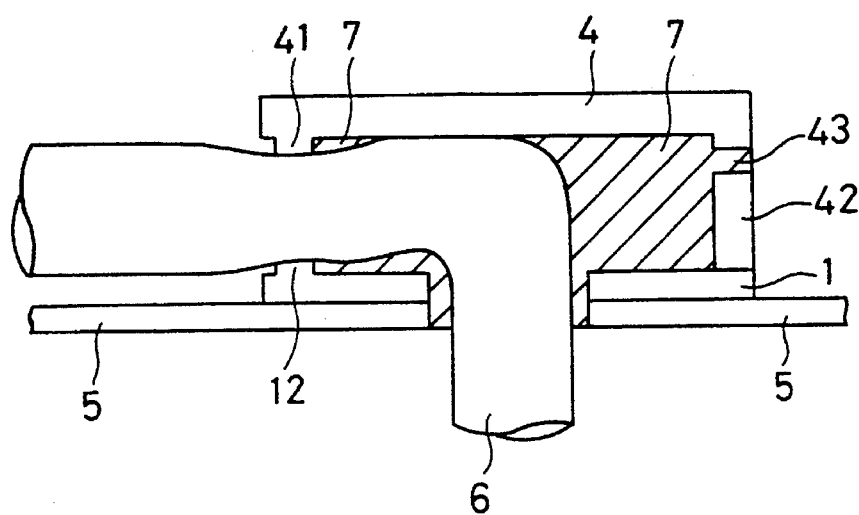
FIG. 8 is a cross section illustrating a manner of employment in which a cable clamp for a motor is secured in accordance with a fourth embodiment of this invention.

Referring to FIG. 8, if a small hole 43 is made on the back cover 42 of the slide member 4, it is convenient to inject the waterproof adhesive 7 into the hollow space of the slide member 4, resultantly enhancing the watertightness.

Although this invention has been described with reference to specific embodiments, this description is not meant to be construed in a limiting sense. Various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A cable clamp for a motor comprising:
    a fixing member having a pair of bottom plates which are disposed in parallel relation to each other, defining an opening therebetween to allow a cable to egress from a frame and having a pair of guide members which are disposed in parallel relation to each other and bridging the bottom plates, said guide members having stoppers disposed therein; and
    a slide member which slides along said pair of guide members and defines a hollow space therein to secure said cable upon egress from said slide member.

2. The cable clamp for a motor according to claim 1, further comprising:
    a first projection attached to and extending downwardly from said slide member for contacting the cable; and
    a second projection attached to and extending upwardly from one of said pair of bottom plates for contacting the cable;
    wherein the cable is pinched between the first and second projection as the slide member slides across said pair of guide members.

3. The cable clamp for a motor according to claim 1, wherein the frame is generally planar and has a depression surrounding an orifice, said cable extending through the orifice and being received within the slide member.

4. The cable clamp for a motor according to claim 3, wherein said depression forms an interior recess, said cable clamp further comprising:
    a waterproof adhesive disposed within the hollow space and surrounding the cable within the recess.

5. The cable clamp for a motor according to claim 1, further comprising:
    a waterproof adhesive disposed within the hollow space and surrounding the cable to form a water tight barrier between the frame and the cable.

6. The cable clamp for a motor according to claim 1, wherein the slide member has a small hole disposed within a side thereof such that a waterproof adhesive may be injected into the hollow space within the slide member.

7. The cable clamp for a motor according to claim 1, wherein the frame defines an orifice, said cable clamp further comprising:
    a rigid member continuous with the frame and surrounding said orifice at an angle thereto, thereby defining an angled channel such that the cable extending through the orifice is angled before being secured by said slide member.

8. A cable clamp which is attachable to a frame about a frame orifice for clamping a cable comprising:
    a first pair of parallel plates attached to the frame and defining an opening therebetween such that a cable may egress from the frame orifice;
    a second pair of parallel plates normal to and extending upwardly above said first pair of plates thereby forming a pair of side rails; and
    a slide member having a top and a pair of sides connected to said top to thereby define a hollow space, said slide member having a pair of grooves so configured and arranged to slidably receive said pair of side rails;
    wherein said slide member is arranged to clamp the cable between one of said first pair of parallel plates and the top thereof as the pair of side rails are slidably received within said pair of grooves.

* * * * *